March 20, 1973 J. E. FOSTER ET AL 3,721,962

BEAM ACCESSED MOS MEMORY WITH BEAM READING, WRITING, AND ERASING

Filed Aug. 3, 1970 6 Sheets-Sheet 1

INVENTORS
JOHN E. FOSTER &
TUH-KAI KOO

BY

THEIR ATTORNEYS

March 20, 1973 J. E. FOSTER ET AL 3,721,962

BEAM ACCESSED MOS MEMORY WITH BEAM READING, WRITING, AND ERASING

Filed Aug. 3, 1970 6 Sheets-Sheet 2

INVENTORS
JOHN E. FOSTER &
TUH-KAI KOO

BY

Louis A. Kline
John J. Callahan
Harry W. Barron

THEIR ATTORNEYS

INVENTORS
JOHN E. FOSTER &
TUH-KAI KOO

BY Louis A. Kline
John J. Callahan
Harry W. Barron
THEIR ATTORNEYS

March 20, 1973 J. E. FOSTER ET AL 3,721,962

BEAM ACCESSED MOS MEMORY WITH BEAM READING, WRITING, AND ERASING

Filed Aug. 3, 1970 6 Sheets-Sheet 4 x y

INVENTORS
JOHN E. FOSTER &
TUH-KAI KOO

BY Louis A. Kline
John J. Callahan
Harry W. Barron
THEIR ATTORNEYS

INVENTORS
JOHN E. FOSTER &
TUH-KAI KOO

BY Louis A Kline
John J. Callahan
Harry W Barron
THEIR ATTORNEYS

INVENTORS
JOHN E. FOSTER &
TUH-KAI KOO
BY Louis A. Kline
John J. Callahan
Harry W. Barron
THEIR ATTORNEYS 3,721,962

BEAM ACCESSED MOS MEMORY WITH BEAM READING, WRITING, AND ERASING

John E. Foster and Tuh-Kai Koo, Dayton, Ohio, assignors to The National Cash Register Company, Dayton, Ohio Filed Aug. 3, 1970, Ser. No. 60,572
Int. Cl. G11c 7/00, 11/40, 11/26
U.S. Cl. 340—173 CR 24 Claims

ABSTRACT OF THE DISCLOSURE

There is described a beam accessed metal oxide semiconductor memory into which binary information can be written and stored and from which that information can be read or erased. The writing, reading, or erasing is accomplished by causing an electron beam of either a high or a low intensity to scan across the gate or drain electrodes of the memory elements while simultaneously applying either a read, a write, or an erase voltage to the gate electrode thereof. There is also described means for controlling the beam position in a self-clocking manner. This is accomplished by providing metal indexing strips along the path which the beam travels and then counting the pulses created in the strips as the beam scans thereacross.

This invention relates to a memory and, more particularly, to a beam accessed memory for use in digital equipment requiring memory apparatus.

Existing beam accessed memory apparatus includes the well-known electrostatic storage tubes as typified by U.S. Pat. No. 2,951,176, issued Aug. 30, 1960, on the application of Frederic Calland Williams and entitled "Apparatus for Storing Trains of Pulses," and the many improvements thereon. That device has limited utility in that the time during which a binary digit (bit) may be stored is limited. Thus periodic regeneration is required. Further, the readout from that type of a device is destructive and thus undesirable.

Other types of beam accessed memories make use of semiconductor devices as the memory elements. Included in those types of devices is apparatus described in U.S. Pat. No. 3,401,294, issued Sept. 10, 1968, on the application of James R. Cricchi and Walter G. Reininger, and entitled "Storage Tube," and U.S. Pat. No. 2,547,386, issued Apr. 3, 1951, on the application of Frank Gray, and entitled "Current Storage Device Utilizing Semiconductors." The problem with those devices is that reading information cannot be accomplished with the electron beam, and thus a manual reading operation or complicated external circuitry is necessary. Another device using semiconductors in a beam accessed memory is described in U.S. Pat. No. 2,981,891, issued Apr. 25, 1961, on the application of John W. Horton and entitled "Storage Device." That device requires a negative resistance diode and a rectifying diode to have a nondestructive readout by the electron beam. However, it is very difficult to construct negative resistance diodes on integrated circuits, so large-capacity beam access memories cannot be made using this principle.

For a truly large-capacity beam access memory (for example, one million bits or larger), it is necessary to use integrated circuits for the memory elements, and, for cost and space reasons, it is desirable to be able to use metal-oxide semiconductor (MOS) transistors as the memory elements. A beam access memory of that type is described in the Proceedings of the IEEE, volume 56, No. 2, February 1968, at pages 158 to 166, in an article entitled "An Electron Beam Activated Switch and Associated Memory," by N. C. MacDonald and T. E. Everhart.

In that memory, complicated MOS device structure is necessary to facilitate beam readout. Thus packing density decreases, and cost increases.

Another problem with all of the above-mentioned prior-art devices is the manner of indexing the position of the beam. Where high packing density is necesary, the beam must be capable of being directed to very specific areas of the memory plane. Thus some sort of indexing scheme on the integrated circuit target is necessary. Further, if this indexing scheme can be used for clocking the logic circuitry necessary to operate the memory, a much simpler memory can be constructed, with resulting cost and space savings.

In accordance with one preferred embodiment of this invention, there is provided a beam accessed semiconductor memory which comprises a plurality of semiconductor devices, each of which has a first and a second main electrode and a control electrode. There is an electrical path between the first and second main electrodes of each of these devices which has either a first or a second resistance. The path in any one of said devices has the first resistance in the event a voltage is applied to the control electrode of that device, which has a polarity the same as, and a magnitude greater than, a certain threshold voltage associated with that device. The path will have the second resistance, which is greater than the first resistance, in the event a voltage is applied to the control electrode of that device which has a polarity opposite from or a polarity the same as and a magnitude less than that threshold voltage associated with that device. First selected ones of the devices have a first threshold voltage associated therewith, and second selected ones of the devices have a second threshold voltage associated therewith, where the second threshold voltage has the same polarity as and a greater magnitude than the first threshold voltage. The memory further includes means for connecting each of the control electrodes to a source of voltage which provides a voltage having a value between the first and second threshold voltages. The memory further includes means for causing an energy beam to be directed towards the first main electrode of each of the devices, one at a time.

The invention is hereinafter described with reference to the following figures, in which.

Figure 5:
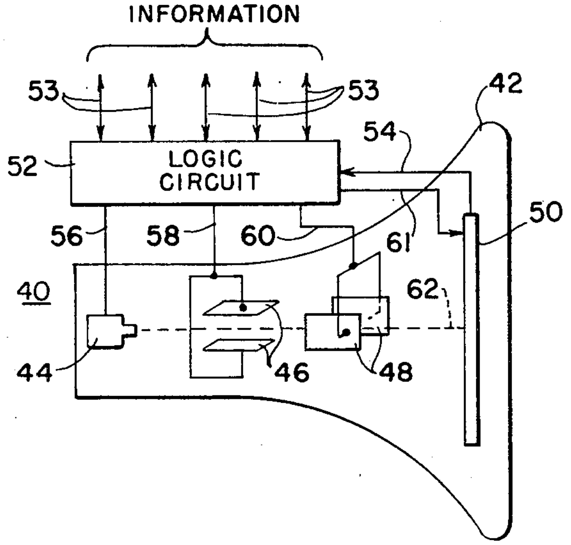
FIG. 5 shows generally the beam access memory.
Figure 9:
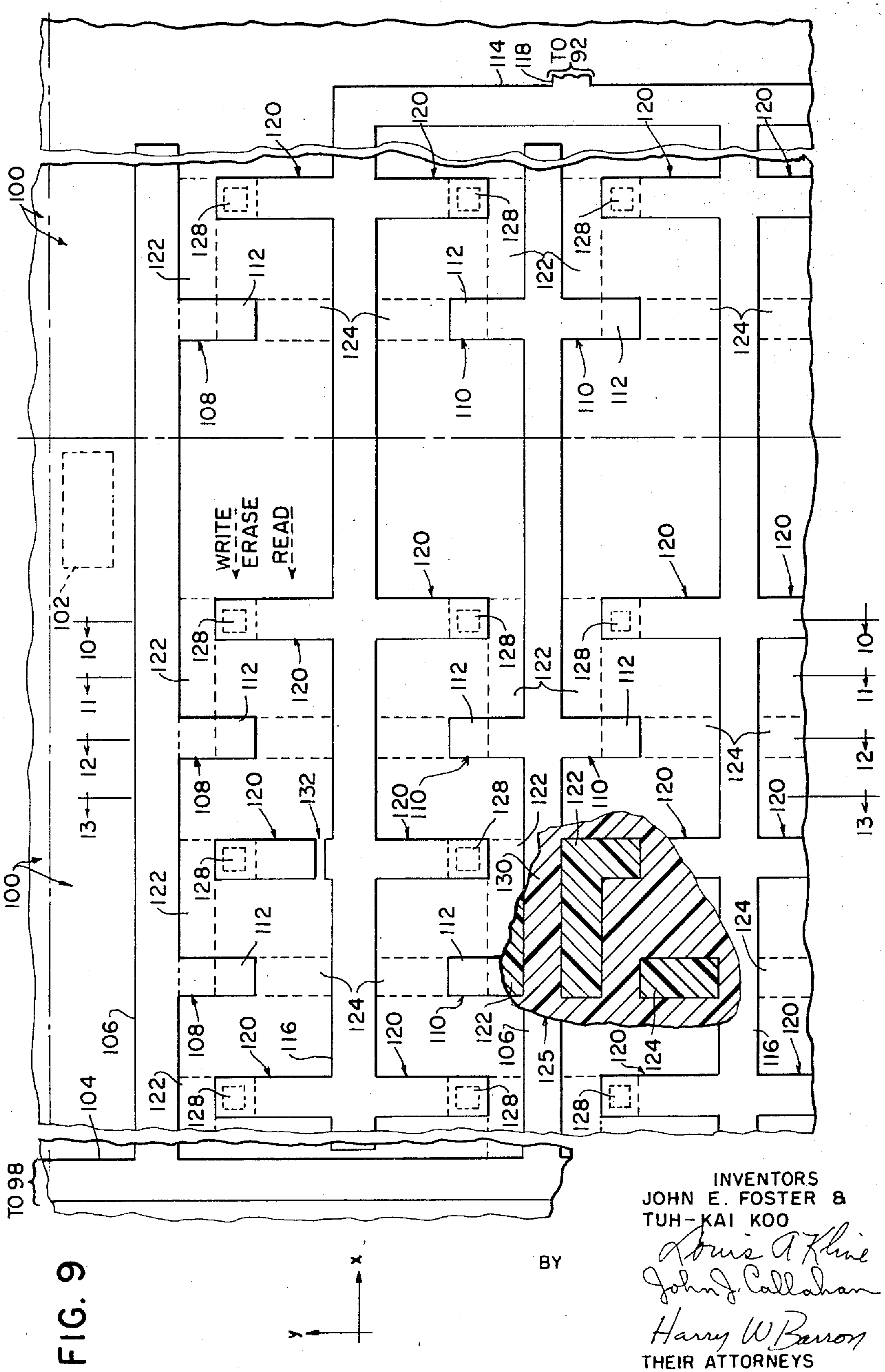
FIG. 9 is a diagram showing expanded portion of the section shown in FIG. 8.
Figure 14:
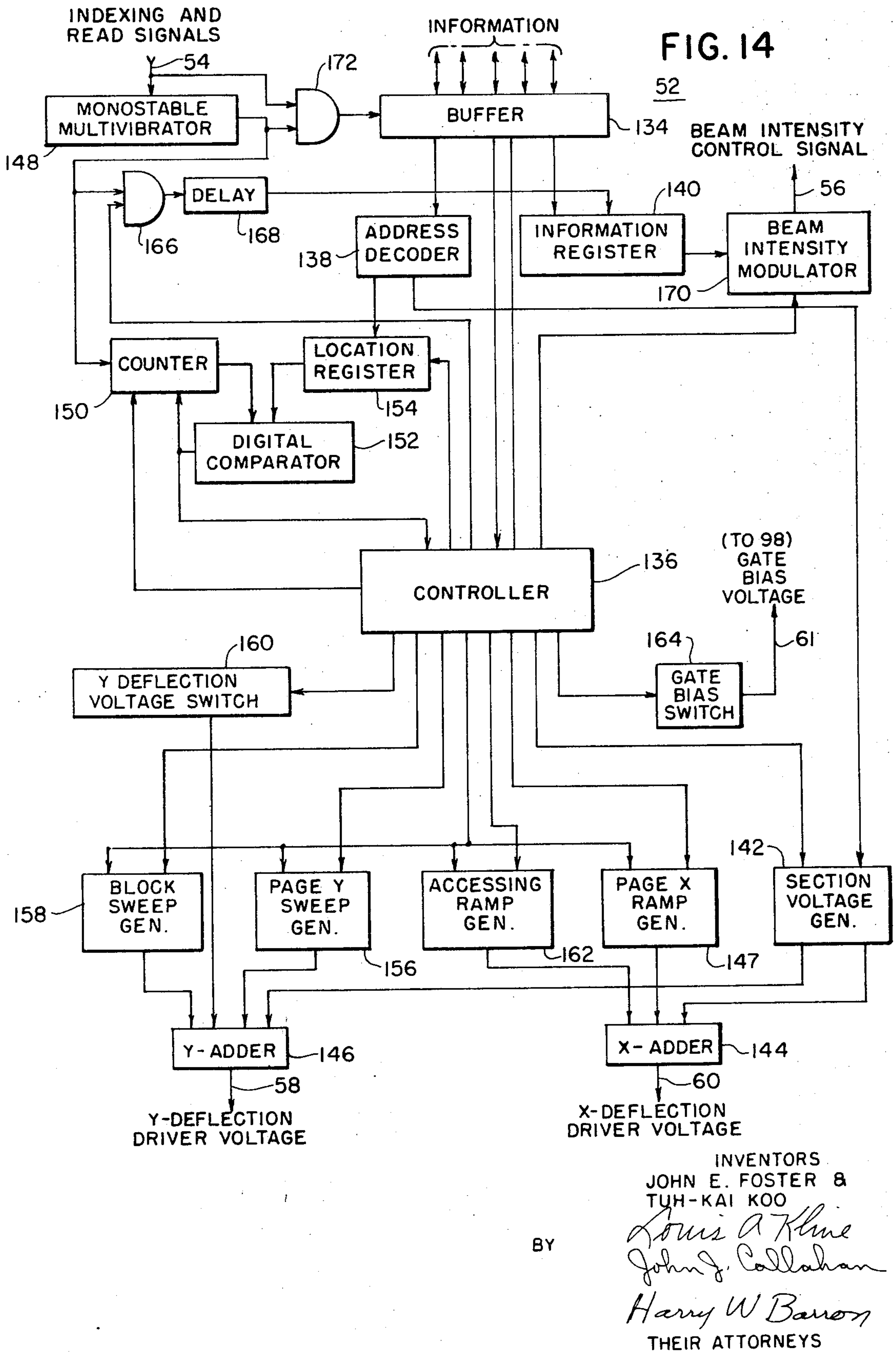

FIGS. 10, 11, 12 and 13 show cross-sections taken along respective lines 10—10, 11—11, 12—12, and 13—13 in FIG. 9; and FIG. 14 is a block diagram showing the logic control circuitry for the memory shown in FIG. 5.

Before describing the memory itself, a description of the principles of operation of the memory will first be given. For this, reference is made to FIG. 1, which shows a P channel enhancement metal-oxide-semiconductor (MOS) transistor 10. The transistor 10 includes a substrate 12, of N doped silicon, which has two regions 14 and 16, of P doped silicon, diffused therein. Located above the substrate 12 and the regions 14 and 16 and connecting regions 14 and 16 is a layer of oxide material 18, which may be silicon dioxide. Placed on top of the oxide material 18 is a metal material 20, such as aluminum.

A pair of electrical connecting leads 22 and 24 are shown connected, respectively, to the metal material 20 and the region 16. A load resistor 26 is connected between the lead 24 and ground. The substrate 12 is also connected to ground. Hereinafter, the region 14 will be referred to as the drain 14, the region 16 as the source 16, and the material 20 as the gate 20.

The semiconductor 10 has a certain threshold voltage naturally associated therewith. This voltage may be in the order of approximately −3 to −4 volts. If a voltage having a magnitude greater than the threshold voltage of the semiconductor 10 is applied to the gate 20 through the lead 22, a relatively low resistance (in the order of 25 kilohms) conduction path, or a channel, will exist between the drain 14 and the source 16 through the substrate 12 in the region near the oxide material layer 18. However, if the voltage applied to the gate 20 through the lead 22 has a magnitude less than the threshold voltage of the semiconductor 10, the conduction path between the drain 14 and the source 16 will exhibit an extremely high resistance (in the order of 100 megohms) and for all practical purposes will be an open circuit.

The semiconductor 10 may be used as a memory element if one can vary the threshold voltage in such a manner that it could be controlled to be either above or below a given voltage which is to be applied to the gate 20. In this manner, whenever this given voltage is applied to the gate 20, either there will be a conduction path between the drain 14 and the source 16, or there will not be a conduction path between the drain 14 and the source 16. In the first case, the conduction path could be used to represent a logical "0" bit, and, in the latter case, the lack of a conduction path could be used to represent a logical "1" bit.

It has been found that, if one directs an electron beam towards the gate 20 of the semiconductor 10, while at the same time applying a certain voltage to the gate 20, the threshold voltage of the semiconductor 10 can be changed as a function of the beam intensity and the value of the gate voltage. For instance, where the semiconductor 10 is a P channel MOS device and a positive five volts is applied to the gate 20, the threshold voltage will change from about −3 volts to as much as −60 to −80 volts. Thus, one way in which a bit could be written into the semiconductor 10 would be to apply a certain voltage to the lead 22 and either apply an electron beam to the gate 20, if it is desired to change the threshold voltage, or not apply the electron beam to the gate 20, if it is desired to maintain the threshold voltage at its present value.

The threshold voltage shift of the MOS device 10, upon receiving electron bombardment, has been explained by induced positive charge accumulation, or trapping, at the substrate 12-oxide material layer 18 interface. Although the detailed mechanism of the trapping process is yet to be completely understood, a simplified model is set out below. This model offers satisfactory explanation to the experimental observation on the macroscopic scale.

Figure 1:
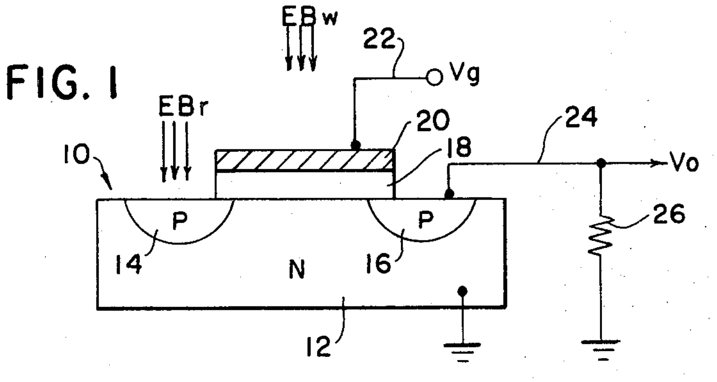
FIG. 1 shows a metal oxide semiconductor.

Considering a MOS device 10 in FIG. 1, an electron beam $EB_w$ is used to bombard the metal gate 20 as shown. If the electron beam energy is high enough to penetrate the metal gate 20 and the electrons continue to propagate inside the oxide material layer 18, electron-hole pairs are generated by collision process. Since the hole mobility inside the oxide material layer 18 is very small in comparison to the mobility of electrons, one may assume that all the holes are trapped immediately after generation, and electrons will be the only mobile charge carriers.

If there is no electric field inside the oxide material layer 18, space charge neutrality exists. Therefore, when the bombarding electron beam is turned off, the electron-hole pairs will recombine, and no space charge will be accumulated anywhere in the oxide material layer 18. However, if an electric field is created inside the oxide material layer 18, by, for instance, biasing the gate 20 positively with respect to the substrate 12, the free electrons will drift toward the metal gate 20 and will be neturalized upon entering the gate 20. On the other hand, the existence of an energy barrier at the substrate 12-oxide material layer 18 interface prevents the entry of electrons from the substrate. The trapped holes near the substrate 12-oxide material layer 18 interface are, therefore, not neutralized and constitute positive charge accumulation. As the electrons continue to leave the oxide material layer 18, the positive charge accumulation continues to build up. The process continues until the biasing voltage drops entirely across the space charge region and a zero potential gradient is established within the rest of the oxide layer 18, so that electron flow stops. A good approximate treatment of the electron transport and space charge build up on a macroscopic scale can be obtained by applying the continuity equation inside the oxide layer 18 with zero boundary condition at the interface. When equilibrium is reached, and if the irradiation ceases before the biasing voltage is withdrawn, all the electrons will be recombined. The deficiency of electrons near the substrate 12-oxide material layer 18 interface results in the trapped holes not being neutralized, and a positive space charge layer results. Since no more mobile electrons are available and the oxide material layer 18 remains an insulator, no electron transport is possible, and the space charge remains trapped, or "stored," until another bombardment makes free electrons available to change the status.

The effect of the space charge at the interface can be treated with conventional MOS theory. If the structure is in the form of a field effect transistor, it increases the magnitude of the threshold voltage of the device. The magnitude of the threshold voltage can be returned to its initial value if the bombardment is repeated with a negative voltage applied to the gate 20.

A typical example would be a device having its threshold voltage changed from about −3 volts to about −60 volts; this would require a voltage of +4 volts applied to the gate 20 and an irradiation at $2\times10^{-15}$ coul./cm.$^2$ with a kilovolt electron beam applied to the channel area. This could be accomplished by applying to an effective channel area of 0.15 mil by 0.15 mil a 5-microampere beam for 570 nanoseconds or a 2.9-microampere beam for one microsecond. Under these beam conditions, the new threshold voltage can be varied by merely varying the gate 20 voltage. It should be noted that this threshold voltage shift is reversible, reproducible, and very stable. It can be reversed by another bombardment with a negative gate voltage. In the reverse process, a shorter exposure time is required, since the stored positive charge adds the effect of the applied field.

Figure 2:
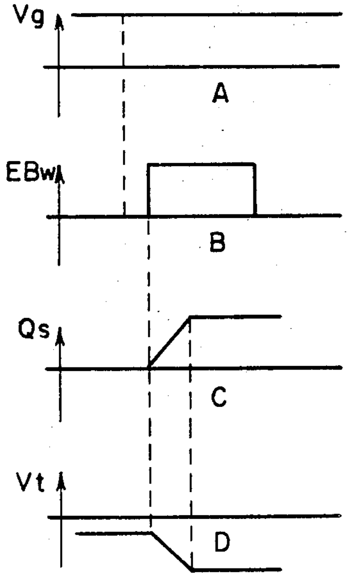
FIG. 2 shows a series of waveforms useful in understanding how a binary bit may be written into the semiconductor shown in FIG. 1.

FIG. 2 shows a series of waveforms which graphically illustrate how the threshold voltage may be changed. FIG. 2A shows a gate voltage of some arbitrary positive value which is applied through the lead 22 to the gate 20, and FIG. 2B shows the time during which the beam is on. With these two events occurring simultaneously, the negative charges in the oxide material layer 18 will tend to move towards the metal layer 20, thereby creating a positive charge build up along the interface of the substrate 12 and the oxide layer 18 until a certain maximum is reached. FIG. 2C shows graphically this charge $Q_s$ build up at the interface of the oxide material layer 18 and the substrate 12. The threshold voltage $V_t$ of the semiconductor 10, in turn, will go from the initial value of in the order of −3 volts to an increased magnitude in the order of between −20 and −80 volts, as seen in FIG. 2D. However, in practice, the threshold voltage $V_t$ will be limited to the puncture voltage of the oxide material layer 18. With this high-magnitude threshold voltage $V_t$, the semiconductor 10 has had written therein, and is now storing, a "1" bit.

If it is desired to erase the "1" bit stored in the semiconductor 10, a procedure which is substantially opposite to the above procedure is performed. More specifically, when one wishes to erase a "1" bit from the semiconductor 10, the voltage applied to the gate 20 is made negative. This causes the charge build up between the interface of the oxide material layer 18 and the substrate 12 to be dissipated, and the threshold voltage will return to its normal value of approximately −3 volts.

Figure 3:
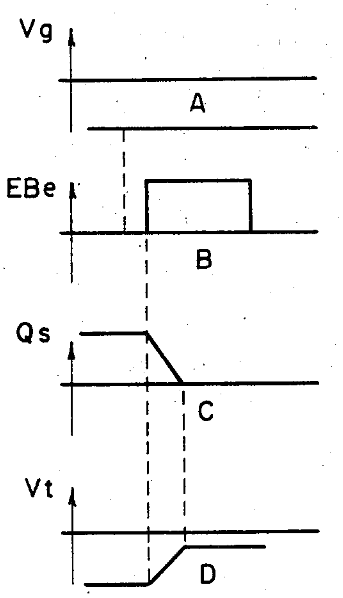
FIG. 3 shows a series of waveforms useful in understanding how the binary bit written into the semiconductor shown in FIG. 1 may be erased therefrom.

Referring to FIG. 3, a series of waveforms is shown which graphically illustrates the erase procedure. FIG. 3A shows the negative voltage applied to the gate 20, and FIG. 3B shows the electron beam being pulsed on at a given time. As seen from FIG. 3C, the charge $Q_s$ between the interface of the oxide material layer 18 and the substrate 12 decreases from its high value to a zero value, and from FIG. 3D it is seen that, as the charge $Q_s$ decreased, the magnitude of the threshold voltage $V_t$ also decreased, until it returns to the initial value of approximately −3 volts.

If a "0" bit had been written into the semiconductor 10 (that is, if the threshold voltage $V_t$ thereof had been allowed to remain at its initial value by the lack of a beam being applied to the gate 20 thereof), it would not be necessary to pulse the electron beam off when it is applied to the semiconductor. The application of the electron beam in conjunction with the application of the negative voltage to the gate 20 would have no effect on the threshold voltage $V_t$, because there would be no charge build up to be dissipated.

When one wishes to read the logical bit stored in the semiconductor 10, it is necessary to cause the electron beam to be shifted from the gate 20 of the semiconductor 10 to its drain 14 region. The electron beam will act as a current source connected to the drain 14. If the threshold voltage $V_t$ of the semiconductor 10 is lower than the read voltage which is applied to the gate 20, a conduction path having a relatively low channel resistance will exist between the drain 14 and the source 16. This will cause a current to flow through the resistor 26 and a voltage $V_0$ to exist thereacross. On the other hand, if the threshold voltage $V_t$ of the semiconductor 10 was higher than the voltage applied to the gate 20, the nearly infinite channel resistance between the drain 14 and the source would result in a negligible current flow therebetween and consequently a negligible voltage drop across the resistor 26. Thus the substantial voltage drop across the resistor 26 due to the substantial current flowing therethrough indicates that a "0" bit had been written into the semiconductor 10 and was being stored thereby. Similarly, a negligible voltage drop across the resistor 26 due to a negligible current flowing therethrough indicates that a "1" bit had been written into the semiconductor 10 and was being stored thereby.

Figure 4:
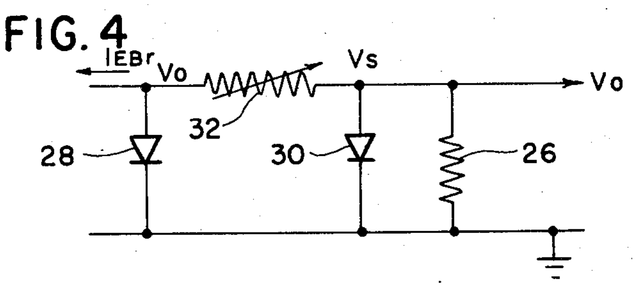
FIG. 4 is a circuit diagram useful in understanding how a bit written into the apparatus shown in FIG. 1 may be nondestructively read therefrom.

FIG. 4 shows a schematic diagram of the reading circuit described above. The two diodes 28 and 30, respectively, represent the rectifying junction between the drain 14 and the substrate 12 and between the source 16 and the substrate 12.

The anodes of the diodes 28 and 30 are connected together through a variable resistor 32, which represents the resistance of the channel of the semiconductor 10. The resistor 32 will have a relatively low value, which is in the order of 25 kilohms, if the threshold voltage of the semiconductor 10 is less than its gate voltage; similarly, the resistor 32 will have an extremely high resistance, which is in the order of 100 megohms, if the threshold voltage of the semiconductor 10 is greater than its gate voltage. As previously mentioned, the electron beam represents a current source and is shown as a current $I_{EB_r}$ which is flowing between ground and the junction of the anode of the diode 28 and the resistor 32. If one sets the value of the resistor 26 at one megohm and the value of the resistor 32 is at approximately 100 megohms, negligible current $I_{EB_r}$ will flow through the resistor 26, and a negligible voltage $V_0$ will appear thereacross. This will occur in spite of the fact that the current $I_{EB_r}$ is derived from a current source, because the diode 28 will undergo nondestructive breakdown, which prevents buildup of extremely high voltages. If, on the other hand, the value of the resistor 32 is approximately 25 kilohms, substantial current $I_{EB_r}$ will flow through the resistor 26, and a substantial voltage $V_0$ will appear thereacross. Thus, the voltage $V_0$ appearing across the resistor 26 is determined by the value of the resistor 32, which in turn is determined by the threshold voltage $V_t$. Since the value of the threshold voltage $V_t$ is determined by the value of the stored bit, the value of the voltage $V_0$ represents the value of the bit being read.

With the above in mind, reference is now made to FIG. 5, where a memory 40 using the invention herein is shown. The memory 40 includes a casing 42, in which a partial vacuum is created. The casing 42 seals within this partial vacuum an electron-beam-providing means 44, a pair of Y-deflection plates 46, and a pair of X-deflection plates 48. There is further included within the casing 42 a target 50, which includes a plurality of integrated circuit wafers. The target 50 will be explained in greater detail hereinafter.

The memory 40 further includes a logic circuit 52, which, in response to digital information applied on lines 53 and signals from the target 50 applied on a line 54, causes a beam intensity control signal to appear on a line 56, a Y-deflection drive voltage to appear on a line 58, an X-deflection drive voltage to appear on a line 60, and bias voltages to appear on a line 61. The beam intensity control signal appearing on the line 56 is applied to the electron-beam-providing means 44 and will control the intensity of its beam 62 in such a manner that the beam will be either on or off. When the beam 62 is on, it will be directed between the Y-deflection plates 46 and the X-deflection plates 48 in such a manner that it can be applied to any point on the target 50. The amount of Y and X deflection will depend upon the voltages appearing, respectively, on the lines 58 and 60.

The beam 62 arrives at a given point on the target 50 by being scanned in horizontal and vertical directions from a given point on the target 50. As it is being scanned, self-clocking indexing signals are generated on the line 54 and control the logic circuit 52. These signals on the line 54 are self-clocking signals, so that the memory 40 is a self-clocking system which does not require the presence of an internal clock or the many resulting connections necessary between the internal clock and various circuit elements in the memory 40.

Figure 6:
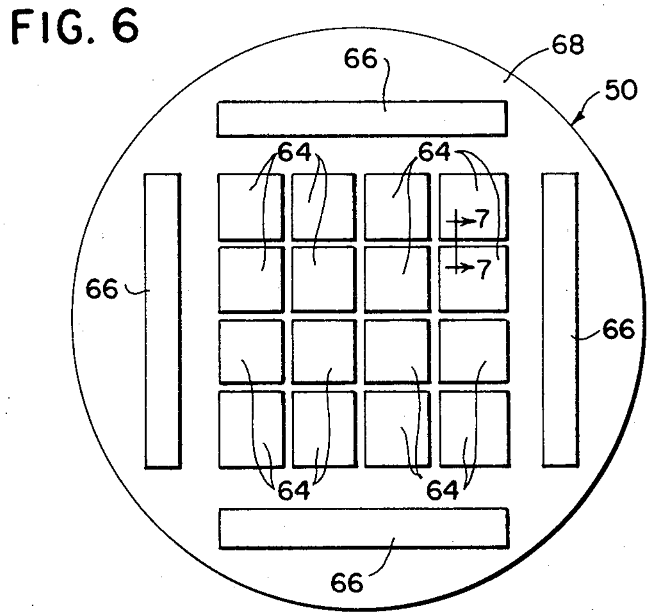
FIG. 6 shows the target shown in FIG. 5.

Referring now to FIG. 6, the side of the target 50 to which the electron beam 62 is applied is shown. The target 50 includes sixteen integrated circuit wafers 64, which are arranged in a four-by-four matrix. Each of these integrated circuit wafers will hereinafter be referred to as a section, and a more complete description of a section will be given hereinafter. The target 50 further includes four control circuits 66, which are positioned along the four sides of the matrix of sections 64. The sections 64 and the control circuits 66 are placed on a substrate 68 and are held in a fixed position thereon. There is no interconnection between any of the sections 64. All electrical connections between a section 64 and one of the control circuits 66 are made on the opposite side (not shown) of the substrate 68.

Figure 7:
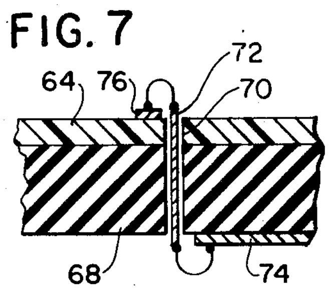
FIG. 7 is a cross-sectional view taken along the line 7—7 of FIG. 6, showing how the interconnection between various parts of the target may be made.

FIG. 7 is a cross-sectional view taken along the line 7—7 in FIG. 6 and shows how a connection is made from a given section 64 to the other side of the substrate 68. This is accomplished by having a hole 70 drilled through the substrate 68 and inserting an electrically-conducting member 72 through the hole 70. The member 72 is of such a length that it protrudes slightly above the top of the sections 64 and protrudes slightly below the bottom of the substrate 68. There is further included on the bottom of the substrate 68 a conductor 74, which may be plated wire or any other convenient means of providing an electrical conductor and which is coupled to one of the sections 64. Each of the sections 64 has five bonding pads 76, only one of which is shown in FIG. 7. A wire may be connected from the bonding pad 76 to the conductor 72. Similarly, on the other side of the substrate 68, a wire is connected from the conductor 72 to the conductor 74. In this manner, an electrical path will exist from the bonding pad 76 through the conductors 72 and 74 to the proper one of the control circuits 66. It should be noted that there will be a hole 70 and a conductor 72 for each of the bonding pads 76 on each of the substrates 68, and the connections between the substrates and the control circuits will be made in this manner. A variation of this would be plating the inside of the hole 70 with a conductor and bonding the wires to this plating.

Figure 8:
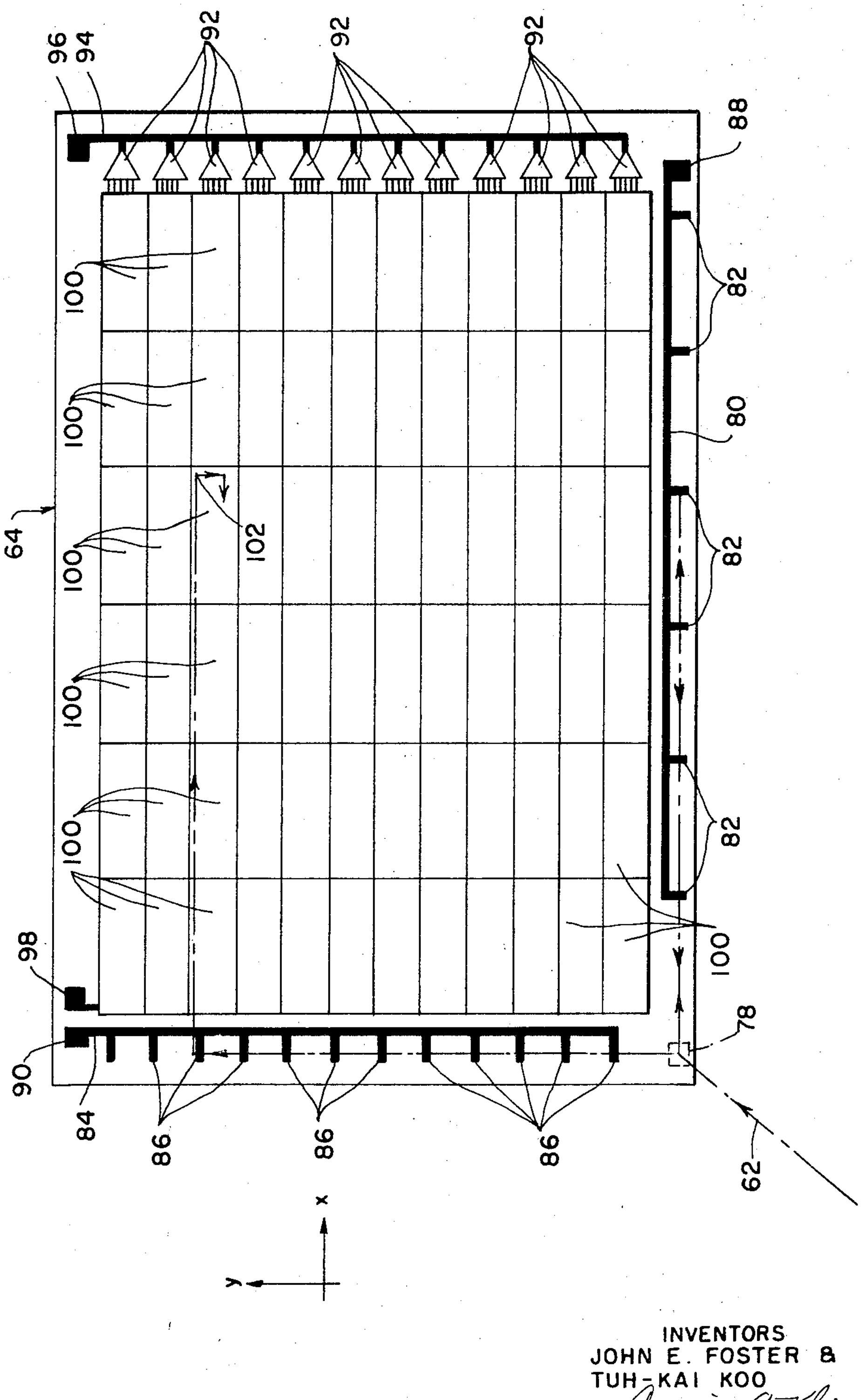
FIG. 8 is a view of one section of the target shown in FIG. 6.

Referring now to FIG. 8, there is shown one given section 64. The section 64 may be a piece of semiconductor substrate 930 mils by 948 mils on which memory elements and electron beam indexing strips are built. Of this area, 870 mils by 880 mils is used for memory elements, and 30 mils on each side of the section is used for beam location indexing strips, sensing pads, and sensing amplifiers.

An area 78 on the section 64 is designated as the Initial Target Area (ITA) and is positioned in one corner of the section 64. The deflection system of the memory 40 is accurate enough so that the electron beam 62 may be positioned in the ITA 78 without the necessity of using feedback techniques to position it precisely. Along the X-direction side of the section 64 taken from the ITA 78 corner, there is a strip 80 having a plurality of fingers 82 extending therefrom. The fingers 82 are of such a dimension that they extend across the entire Y dimension of the ITA 78. Along the Y-direction side of the section 64 taken from the ITA 78, there is a second conductor 84, which also has fingers 86 extending therefrom. The fingers 86 are of such a dimension that they extend entirely across the X dimension of the ITA 78. Each of the conductors 80 and 84 is connected to respective bonding pads 88 and 90. These bonding pads 88 and 90 are connected to the control circuits 66 in the manner previously described with respect to FIG. 7.

Along another side of the section 64 there is provided a plurality of amplifiers 92. Each of the amplifiers 92 has a plurality of inputs and a single output; each of the outputs is coupled to a conductor 94, which in turn is coupled to a bonding pad 96. The bonding pad 96 is connected to the control circuits 66 in the manner previously explained with respect to FIG. 7. There is also provided along the remaining side of the section 64 another bonding pad 98, which is used to couple the proper bias voltages to be memory elements which are built into the section 64.

The remaining portion of the section 64 is divided into a plurality of subdivisions, which hereinafter are referred to as pages and which will be described in detail hereinafter. In the section 64, there are seventy-two pages, which are arranged in a six-by-twelve matrix. Each of the pages is 145 mils by 74 mils in dimensions. A strip which may be three mils wide at the top and five mils wide along the right side is provided for the page landing areas.

The electron beam may be directed to any given page by the following procedures. First, the electron beam 62 is directed towards the ITA 78. Thereafter, it is scanned in the X direction so as to cross each of the fingers 82. As the electron beam crosses a finger 82, a self-clocking indexing signal is applied into the conductor 80 and arrives at the pad 88. Each of these signals is then applied to the control circuits 66 and thereafter to the logic circuit 52, where they are counted. It should be noted that each of the fingers 82 is positioned along the right side of an associated column of pages 100. Thus, if one wished to get the fourth page from the right, the electron beam would be scanned in the X direction across the fingers 82 until four signals have been applied to the conductor 80 and counted in the logic circuit 52. After the fourth signal has been sensed, the electron beam would cease scanning and would fly back to the ITA 78.

Thereafter, the electron beam 62 would be scanned in the Y direction across the fingers 86 in the manner previously described with respect to the fingers 82. After a sufficient number of signals have been received in the logic circuit 52 to indicate that the electron beam is at the proper Y position (that is, adjacent to the proper row of the matrix of pages 100), the beam 62 ceases scanning. Thereafter, the electron beam 62 flies to the X position, in which it was at the time it ceased scanning across the fingers 82. At this point, the electron beam will be at the page landing area 102, which is in the upper right-hand corner of the desired page.

The electron beam will thereafter be scanned in a negative Y direction until the proper position has been reached, and thereafter in a negative direction. At this point, the electron beam is being scanned across the desired elements. The manner in which the electron beam 62 is directed in the negative X and negative Y directions will be explained hereinafter in more detail.

In FIG. 9, a detailed drawing of selected portions of the section 64 is shown. More specifically, the extreme right-hand side and the extreme left-hand side of a section 64 are shown, as well as an area in the center of that section 64 at which a pair of pages are joined.

On the extreme left-hand side of the section 64, a bias pad 98 (not shown in FIG. 9) is connected to a vertical biasing strip 104, which runs in a vertical direction down the entire section.

The strip 104 has a plurality of horizontal biasing strips 106 connected thereto, each running horizontally across the section and separated by an equal distance of approximately one mil. The uppermost horizontal biasing strip 106 has a plurality of fingers 108 extending therefrom in the downward direction, and the remaining biasing strips 106 have fingers 110 extending therefrom in both the upward and downward directions. Each of the fingers 108 and 110 is separated from the fingers adjacent thereto by approximately one mil and has a length of approximately one-half mil. In all cases, the width of the metal strips 104, 106, 108, and 110 is approximately 0.2 mil. The thickness of each of the metal strips 104, 106, 108, and 110 is in the range of 1,000 to 20,000 angstroms, and they are constructed on top of a thick oxide layer having a thickness in the range of 5,000 to 20,000 angstroms, except over areas 112 of each of the fingers 108 and 110. The oxide layer under the areas 112 of each of the fingers 108 and 110 is a thin oxide layer in the range of 800 to 3,000 angstroms.

Referring to the extreme right-hand side of FIG. 9, there is shown a vertical indexing strip 114, which has a plurality of horizontal sensing strips 116 extending towards the left therefrom and a single strip 118 extending from the right therefrom. The strip 118 is connected to one of the inputs of one of the sensing amplifiers 92 shown in FIG. 8.

There may be any number of strips 116 extending from the indexing strip 114, and these strips are equispaced from one another by an amount of approximately one mil. Each of the strips 116 has a plurality of indexing finger strips 120 extending from both sides thereof. The fingers 120 are separated from one another by an equal distance of approximately one mil and have a length of approximately three-fourths of a mil. Each of the strips 114, 116, 118, and 120 has a width of approximately 0.2 mil and a thickness in the range of 1,000 to 20,000 angstroms and is placed on a thick oxide layer. The fingers 108, 110, and 120 are so arranged with respect to one another that each finger 120 extends between each finger 108 or 110.

Beneath and connecting each of the biasing fingers 108 and 110 and the indexing fingers 120, there is constructed a region 122, of semiconductor material, which is doped opposite to the conductivity of the substrate 123. For instance, in the cross-hatched area 125 of FIG. 9, there is seen an L-shaped region 122, of semiconductor material, which is under the first one-fourth mil of the finger 108 or 110 (that is, the area not including the area 112 thereof) and under the final one-fourth mil of the finger 120.

The region 122 is directly connected to the indexing finger 120 at the junction 128. The area 125 also includes a region 124, of semiconductor material, which is doped opposite to the conductivity of the substrate 123. The region 124 extends from the end of each finger 108 or 110 to the next indexing strip 116. The region 122 functions as the source of an MOS transistor, and the region 124 functions as the drain thereof. The area 112 of each of the fingers 108 or 110 is directly above the area between the regions 122 and 124 and is placed over a thin oxide layer; thus, the area 112 functions as the gate of the MOS transistor. Constructed in this manner, each of the MOS transistors is capable of being used as a memory element in the manner previously described with respect to FIGS. 1, 2, 3, and 4.

Each of the fingers 120 is connected to the source electrode at the junction 128; thus a direct connection is made between the source region 122 and the indexing finger strip 116. It should be noted that the oxide layer above the drain region 124 is also a thin oxide layer.

For a more complete understanding of structure shown in FIG. 9, reference is made to FIGS. 10, 11, 12, and 13, which, respectively, show a cross-section of FIG. 9 taken along respective lines 10—10, 11—11, 12—12, and 13—13. In FIGS. 10, 11, 12, and 13, like numerical designations are given to correspondingly like elements.

Figure 10:
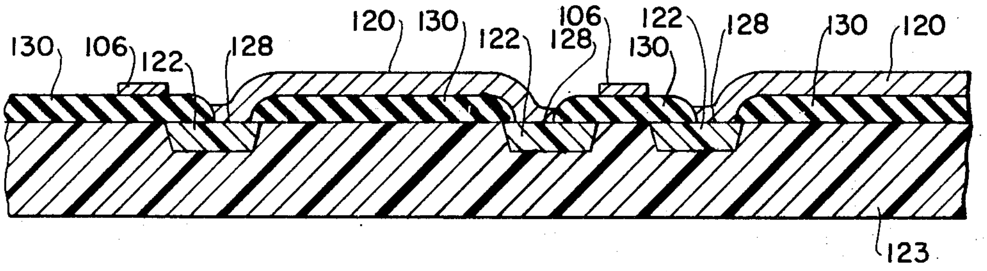

In FIG. 10, it is seen that the metal conductor 106 is a thin metal placed on top of a thick oxide layer 130. Also, the indexing strip 120 is a thick metal placed on top of a thick oxide layer 130. The junction 128 is formed by the junction of the metal indexing finger 120 and the source region 122.

Figure 11:
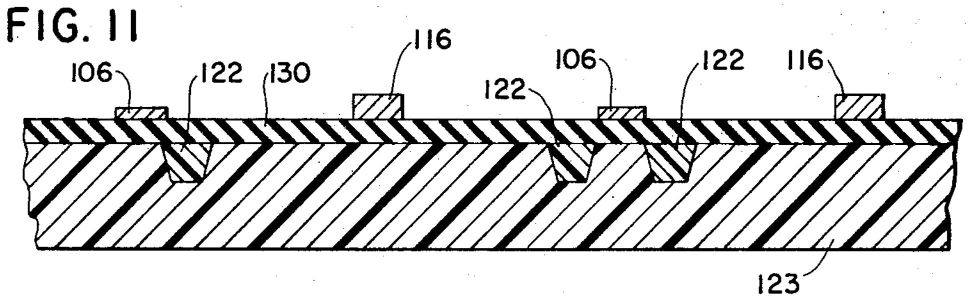
Figure 12:
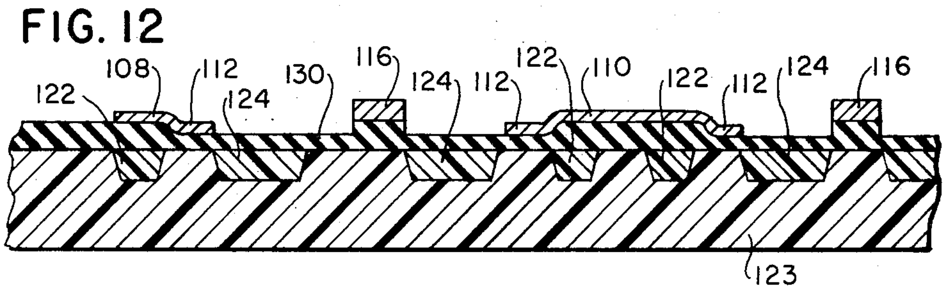
Figure 13:
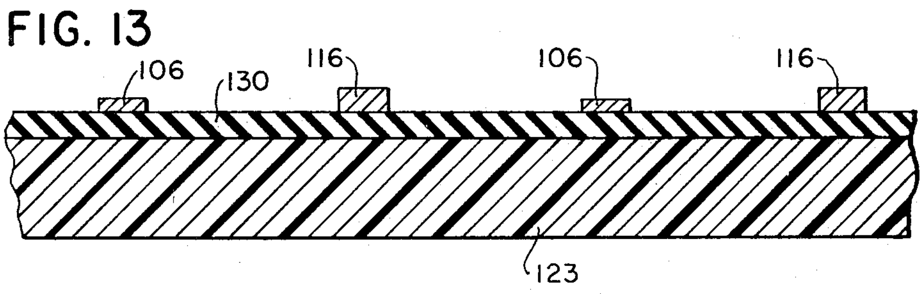

Referring to FIG. 11, it is seen that the metal strips 106 and 116 are all placed above a thick oxide layer. In FIG. 12, it is seen that the oxide layer 130 is thin over the regions of the gate and drain electordes, and in FIG. 13 it is seen that fingers 106 and 116 are placed over a thick oxide layer 130.

Thus, there are a plurality of memory elements each consisting of a source 122 region, a drain 124 region, and a gate 112 region, which are arranged in a row-by-column matrix. Between each pair of rows, there is an indexing strip 116, which has extending therefrom indexing fingers 120 that separate each element along that row. Further, between each pair of rows there is a biasing strip 106 having biasing fingers 108 and 110 connected to each element to provide a bias voltage to the gate electrode of each element in those rows.

Each row of a given page contains 135 memory elements, and a given row will hereinafter be designated as a block. There are 70 blocks in each page. Therefore each page is a 135 by 70 transistor matrix. Thus, in the memory 40, one can store 80,640 words of 128 bits each, or over 13.1 million bits, since in actual practice only 128 of the 135 elements in each block are used to store information. The remaining seven elements are provided in case certain of the elements in a block are defective or inoperative. By providing these extra elements, one can disconnect the inoperative elements by merely open-circuiting the connection between the indexing finger 120 and the indexing strip, as at the point 132 in FIG. 9. The significance of this will be explained hereinafter.

As previously explained, the electron beam can be positioned at the page landing area 102 by the use of the indexing fingers 82 and 86. However, in using the memory, it is desirable that a sequence of 128 logical bits be written in a given block. Once the beam is in the page landing area 102, it is scanned in a negative Y direction, or in other words, down. Each time the beam crosses one of the indexing strips 116, a self-clocking indexing signal is applied through the conductors 114 and 118 to an amplifier 92 associated with that strip 116, and eventually to the logic circuit 52. These signals are in the form of pulses and are counted in the logic circuit 52. After a predetermined number of these pulses have been counted, the beam ceases scanning. As previously explained, when it is desired to write information into the memory or to erase information from the memory, the electron beam will have to be so adjusted that it is positioned at a point where it can be scanned across the gate electrodes of each of the devices in the given block. On the other hand, if it is desired to read information from the particular block, the beam will have to be so positioned that it is at a point where it can be scanned across the drain electrodes of each of the elements in the particular block.

Once the beam has been properly positioned, it is scanned in the negative X direction, or, in other words, to the left. Each time the beam crosses one of the indexing fingers 120, a self-clocking indexing signal is applied to the particular indexing strip 116 associated therewith. Each of these signals in turn is counted by circuits included in the logic circuit 52, and the particular count then existing determines the particular location of the beam.

If it is desired to write information into the memory, the electron beam is scanned across the gate electrodes of each of the elements. The beam is positioned at the gate electrode a fixed time after it has crossed the particular sensing strip 120 associated with that gate electrode (assuming constant scan speed). If it is desired to write a "1" bit into the memory, the beam is turned on just prior to this fixed time after the beam has crossed the sensing strip 120. If it is desired to write a "0" bit into the memory, the beam is turned off during this time. Similarly, when one is reading the information stored in a particular block, the beam is scanned across the drain electrodes of each element in the block. It should be recalled that, when the beam scans the drain electrodes of those elements storing "0" bits, a low-resistance current path exists between the drain and source electrodes, and, when it scans across the drain electrodes of those elements storing "1" bits, a high-resistance current path exists between the source and drain electrodes. In each case where a low-resistance current path exists, a current pulse is caused to appear on the indexing finger 120 as the electron beam is scanned across the drain region 124. This occurs a fixed time after a self-clocking pulse appears on the same indexing finger 120 resulting from the electron beam crossing that finger. Thus, means can be included in the logic circuit 52 which will detect between those signals provided when the beam crosses a sensing strip 120 and those signals provided when a current pulse appears on the sensing strip 120 due to the fact that the electron beam is then scanning the drain electrode. It should be noted that, when the electron beam does cross the drain electrode, the current between the drain and the source is applied to the sensing strip 120 due to the connection between the sensing strip 120 and the source 122 at the junction 128.

If, for one reason or another, one of the elements along a particular block is defective, it is possible, by merely disconnecting the indexing finger 120 from the indexing strip, to disconnect that element from the block. One of the seven extra elements provided in the block will then be used to store the information. A disconnection as just described is shown at the point 132 in FIG. 9. This disconnection should be made relatively close to the sensing strip 116, so that the electron beam, when reading from the block, will cross between the disconnection 132 and the connection 128. With the disconnection 132 positioned at this point, no signals will be applied to the sensing strip 116 either due to the read signal provided when the beam crosses the drain electrode or due to the self-clocking indexing signal when the beam is crossing the indexing finger 120. Because the system is self-clocking, this will result in no clocking pulse being applied to the control circuit 52, and therefore nothing will occur as the result of this defective element's being included in the system.

The advantage of providing the seven extra elements in each block and disconnecting defective elements from a block is that the yield of the section wafers is greatly increased. It can be shown mathematically that the expected yield will be increased from less than 1% to about 68% by using this technique. Further increases can be obtained by providing more extra elements, but a trade-off must be made between the cost of including the extra elements and the extra space required versus the higher yield.

Reference is now made to FIG. 14, where a block diagram of the logic circuit 52 is shown. The logic circuit 52 includes a buffer 134, which can receive or transmit binary information in parallel. The information which the buffer 134 receives will be divided into three categories. These are, first, command information; that is, information which tells the memory whether it is supposed to read, write, or erase. The second type of information which is applied to the buffer 134 is address information, which tells the memory 40 the section, the page, and the block in which information is to be written, read or erased. The final type of information which the buffer 134 can receive is the digital information which is to be written into the memory 40. This third type of information is applied to the buffer 134 only in the event that it is desired to write information into the memory elements.

The command information which is applied to the buffer 134 is applied to a controller 136. The controller 136 includes a series of logic and driver circuits for causing various other circuits in the logic circuit 52 to be turned on or turned off at proper times. The controller 136 may be constructed by known logical design techniques and will herein only be described in detail by function.

The address information applied to the buffer 134 is applied to an address decoder 138. Since the information applied to the buffer 134 will come from a central processor of one sort or another, it is likely that this address information is not in terms of section, page, and block. Therefore, the address decoder 138 will convert the address information applied to the buffer 134 into information representing the particular section, the particular page, and the particular block which is then desired to be worked upon. This decoded information is applied to a section voltage generator 142 and to a location register 154. The information portion of the bits applied to the buffer 134 is applied to an information register 140 and stored therein until a later time. At this later time, the information in the information register 140 will be applied serially out of the information register 140.

The command signal which is applied from the buffer 134 to the controller 136 will tell the controller whether it is desired to write, to read, or to erase information from the memory elements. Assuming first that the command signal requires that information be written into the memory elements, the controller 136 first causes the section voltage generator 142 to apply an analog voltage, which represents the X coordinates of the ITA 78 of the proper section, to an X adder 144, and an analog voltage, which represents the Y coordinate of the ITA 87 of the proper section, to a Y adder 146. These voltages in turn are applied at the outputs of the adders 146 and 144, respectively, on the lines 58 and 60, and therefrom to the Y deflection plates 46 and the X deflection plates 48 within the casing 42 (see FIG. 5). This causes the electron beam to be positioned at the initial landing area 78 of the proper section in which the information is to be written.

The controller waits a certain time, which is determined by the maximum time required to position the electron beam at the ITA 78 from the farthest point on the target, and, thereafter, causes the page X ramp generator 147 to generate a ramp voltage. This ramp voltage is applied to the X adder 144 and added to the X voltage from the section voltage generator 142 to cause the electron beam 62 to scan in the X direction across the fingers 82, as seen in FIG. 8.

Each time a finger 82 is scanned by the beam 62, a voltage pulse appears on the line 54 and is applied to a monostable multivibrator 148. The trailing edge of this pulse triggers the multivibrator 148. The time constant of the multivibrator 148 is adjusted to be greater than the time necessary for the electron beam 62 to scan between one of the indexing fingers 120 and the gate 112 or drain 124 regions of the element associated with that indexing finger 120 and less than the time required for the electron beam 62 to scan between that one indexing finger 120 and the next adjacent one of the indexing fingers 120. In this manner, each time the beam crosses an indexing finger 120, a pulse is provided at the output of the multivibrator 148. Each of these pulses is applied to a counter 150, which counts the leading edge of each pulse applied thereto. The output of the counter 150 is applied to a digital comparator 152.

At the time the controller 136 started the page X ramp generator 147, it also caused the X coordinate of the page portion of the address stored in the location register 154 to be provided to the digital comparator 152. Whenever the count in the counter 150 reaches the value of the page X coordinate stored in the location register 154, a signal is provided by the digital comparator 152. This signal is applied to the counter 150 to reset it to a count of zero, and also to the controller 136 to tell it that the proper X position of the page has been reached.

The controller 136, after receiving the signal from the digital comparator 152, locks the page X ramp generator 147 voltage to its value and ceases applying it to the adder 144. At this time, the electron beam will fly back to ITA 78. Thereafter, the controller 136 causes the page Y coordinate to be applied to the digital comparator 152 and causes the page Y sweep generator 156 to begin generating a ramp voltage. This causes the electron beam 62 to scan in the Y direction across the fingers 86, and, each time a finger 86 is scanned by the electron beam 62, a signal is applied through the pad 90 and eventually to the line 54. Each of these signals triggers the monostable multivibrator 148, as previously explained, and the output thereof is applied to the counter 150 to cause the count therein to increase. When the count in the counter 150 reaches the page Y coordinate value, the digital comparator 152 again provides the signal resetting the counter to zero and informing the controller 136 of this fact. At this time, the controller 136 releases the page X ramp generator 147 voltage and again applies it to the X adder 144. As a result of this action, the electron beam flies to the proper page landing area 102. The controller 136 maintains the voltages provided by the page X sweep generator 147 and the page Y sweep generator 156 at these values. It should be noted that the fly speed of the electron beam 62 is in the order of 335 mils per microsecond, whereas the scan speed of the electron beam 62 is in the order of 1 mil per microsecond.

At this time, the electron beam 62 is being directed to the page landing area 102 in the upper right corner of the proper page 100. It is now necessary to position the electron beam adjacent to the gate electrodes of the proper block in which the information is to be written. This may be accomplished by causing the controller 136 to enable a block sweep generator 158, which provides a ramp voltage to cause the electron beam 62 to be scanned in the negative Y, or downward, direction. At this time, the controller 136 also causes the block address to be applied to the digital comparator 152. As the electron beam scans down the particular page 100, it crosses each of the indexing strips 116, thereby causing a pulse to be applied to the line 54 and trigger the monostable multivibrator 148. These pulses are applied, in the manner previously described, to the counter 150, which increases its count by "one" for each pulse. When the counter 150 arrives at a count equal to the block count stored in the location register 154, the digital comparator 152 again provides a signal which resets the counter 150 to zero and informs the controller 136 that the electron beam 62 is positioned adjacent to the indexing strip 116 which is associated with the proper block. In response to this signal, the controller 136 locks the voltage provided by the block sweep generator 158.

At this time, the controller 136 applies a signal to a Y deflection voltage switch 160, which in turn provides the proper positive or negative voltage to the Y adder 146 to cause the electron beam 62 to move from the indexing strip 116 to a point adjacent to the gate electrode of the proper block in which the information is to be written.

At this time, the controller 136 enables an accessing ramp generator 162 and causes a gate bias switch 164 to provide the proper read bias voltage to the line 61 and the page 98. The accessing ramp generator 162 causes the electron beam 62 to be scanned in the negative X direction, or to the left, across the gate electrodes of each element in the proper block. Each time the electron beam 62 crosses one of the indexing fingers 120, a pulse is generated and eventually applied to the line 54 to trigger the monostable multivibrator 148.

At the same time the controller 136 enabled the accessing ramp generator 162 and the gate bias switch 164, it applied a signal to enable an AND-gate 166. In this case, each of the pulses from the monostable multivibrator 148 is applied through the AND-gate 166 and a delay circuit 168 to the information register 140. On the occurrence of each of the pulses applied to the information register 140, a signal corresponding to the particular bit to be written in the next memory element appears at the serial output of the information register 140 and is applied to a beam intensity modulator 170. The amount of delay provided in the delay circuit 168 is determined by the time required for the electron beam to be scanned from an indexing finger 120 to the gate electrode of the memory element with which that particular indexing finger 120 is associated. Thus, a signal is provided from the information register 140 to the beam intensity modulator 170 just prior to the time the electron beam 62 scans the gate electrode of the memory element.

If the bit provided by the information register 140 is a logical "1" bit, the beam intensity modulator 170 applies a signal to the line 56, which causes the electron beam of a given intensity to be applied. On the other hand, if the bit provided by the information register 140 is a logical "0" bit, no signal is applied to the line 56 by the beam intensity modulator 170, and a beam of a low or zero intensity is scanned across the gate electrode of the particular element. This procedure continues for each of the 128 memory elements which are to be used in a given block.

After the count in the counter 150 has reached a value of 128, a signal is sent from the digital comparator 152 to the controller 136, informing it that the entire block has been scanned by the electron beam. In response to this signal, the controller 136 disables all circuits which are still enabled and informs the buffer 134 that it can accept new information to be processed by the memory.

If one had wished to erase information from a particular block in the memory, the procedure would be similar, with the following three exceptions. First, the information applied to the buffer 134 would include only command and address information. Second, the beam intensity modulator 170 would not be capable of turning the electron beam 62 off or, in other words, a signal would always be appearing on the line 56. Third, the gate bias switch 164 would be caused to provide a negative voltage as opposed to the positive voltage which it had been providing during the read portion of the cycle. In other words, the erase aspect of this operation is similar to writing a "1" bit but with a negative gate bias applied to each of the memory elements in the particular block.

When it is desired to read information which is stored in the memory, the signal applied to the buffer 134 will include a command signal, indicating that a read portion is to be performed, and an address signal, indicating which block of information is to be read. The manner in which the electron beam is applied to the particular block is identical to how it was done previously, with the exception that the voltage provided by the Y deflection voltage switch 160 is slightly different from the voltage previously applied. This is due to the fact that, during the read operation, it is necessary to scan the electron beam 62 across the drain electrodes of each of the memory elements as opposed to across the gate electrodes thereof.

While reading information from the particular block, it should be noted that, as the electron beam 62 is scanned across the block, a self-clocking indexing pulse will occur due to the electron beam 62 being scanned across the indexing fingers 120. Between certain ones of these self-clocking indexing pulses, there will also be read pulses which occur when the electron beam is scanned across those elements which have "0" bits stored therein. In the case of those memory elements having "1" bits stored therein, there will be no read type pulses.

Each of the self-clocking indexing and the read pulses provided when reading from a particular block is applied to the line 54 and the monostable multivibrator 148. These signals are also applied to one input of an AND-gate 172. The other input of the AND-gate 172 is coupled to the output of the monostable multivibrator 148. Since the duration of the multivibrator pulse is just less than the time required for the beam to be scanned from one indexing finger 120 to the next adjacent indexing finger 120, and since the trailing edge of the self-clocking indexing pulses triggers the monostable multivibrator 148, only the read pulses appearing on the line 54 will be applied through the AND-gate 172 and into a serial input of the buffer 134. In other words, the AND-gate 172 is enabled by the self-clocking indexing pulses to pass the read pulses. Each time a read pulse is applied to the buffer 134, it will indicate that a zero bit has been read, and each time no read pulse is applied thereto, it will indicate that a "1" bit has been read.

The signals from the multivibrator 148 are also applied to the counter 150, which counts to a value of 128; when the count in the counter 150 reaches 128, the digital comparator 152 applies a signal to the controller 136, informing it that the entire block has been read. At this time, the controller 136 again disables all circuits which are still enabled and informs the buffer 134 that the information has been read and causes the buffer 134 to transmit the information to the proper place. At this time, the buffer 134 can accept a new signal and either read, write, or erase information as necessary.

What is claimed is:

1. The method of writing and storing digital information in and thereafter reading said information from a given memory element of a beam accessed metal oxide semiconductor transistor memory which includes a plurality of metal oxide semiconductor transistor memory elements, each of said elements having a source, a drain and a gate electrode, said method comprising the steps of:

applying a write voltage to the gate electrode of said given element;

directing, for a given time interval, an electron beam of a given one of a first or a second intensity towards said gate electrode of said given element while said write voltage is being applied thereto, whereby said given element is caused to have a first threshold voltage value in the event said given intensity is said first intensity, and a second threshold voltage value in the event said given intensity is said second intensity;

applying a read voltage to said gate electrode of said given element after said given time interval, said read voltage having a value between said first and second threshold voltage values;

directing an electron beam towards said drain electrode of said given element while said read voltage is being applied thereto; and detecting the current flowing between said source and drain electrodes of said given element while said electron beam is applied to said drain electrode.

2. A method by which digital information may be serially written into, stored by, serially read from and erased from a given number of memory elements of a beam accessed metal-oxide semiconductor device memory which includes a plurality of metal oxide semiconductor device memory elements, each of said devices having a drain, a source and a gate electrode, said method comprising the steps of:

causing an electron beam to be scanned across the gate electrodes of each of said devices, one at a time, the intensity of said beam as it scans across any given device being determined by the bit which is to be written into said given device;

applying a write voltage to the gate electrode of the device then having its gate electrode scanned by said electron beam;

causing said electron beam to thereafter be scanned across the drain electrode of each of said devices, one at a time;

applying a read voltage to the gate electrodes of the device then having its drain electrode scanned by said electron beam;

detecting whether a substantial current is flowing between the source and drain electrodes of each of said devices at the time said electron beam is scanning the drain electrode of that device;

applying an erase voltage to the control electrode of each of said several devices, said erase voltage having a polarity opposite from the polarity of said read voltage; and causing said electron beam to be scanned across the control electrodes of each of said several devices.

3. In a beam accessed semiconductor memory in which a plurality of semiconductor devices are arranged in a matrix, each of said devices having two main electrodes and a control electrode, there being digital information stored in said memory by having a first portion of said devices have a first threshold voltage associated therewith and by having a second portion of said devices have a second threshold voltage associated therewith, the method of reading the information stored in any given device comprising the steps of:

applying a voltage to the control electrode of said given device, said voltage having a value between the value of said first and second threshold voltages;

directing an electron beam towards one of the main electrodes of said given device while said voltage is being applied thereto; and detecting any current flowing between said two main electrodes of said given device while said electron beam is being applied thereto.

4. In a beam accessed semiconductor memory in which a plurality of semiconductor devices are arranged in a matrix, each of said devices having two main electrodes and a control electrode, there being digital information stored in said memory by having a first portion of said devices have a first threshold voltage associated therewith and by having a second portion of said devices have a second threshold voltage associated therewith, the methor of reading the information stored in a block of said devices in a serial by bit order comprising the steps of:

applying a voltage to the control electrode of each device in said block, said voltage having a value between the value of said first and second threshold voltages;

directing an electron beam towards one of the main electrodes of each device in said block, one at a time, while said voltage is being applied thereto; and detecting any current flowing between said two main electrodes of each device in said block, one at a time, while said electron beam is being applied thereto.

5. The method of writing and storing digital information in and thereafter reading said information from a given memory element of a beam accessed insulated-gate field-effect semiconductor memory which includes a plurality of insulated-gate field-effect semiconductor device memory elements, each of said devices having two main electrodes and a control electrode, said method comprising the steps of:

applying a write voltage to the control electrode of said given device;

directing, for a given time interval, an electron beam of a given one of a first or a second intensity towards said control electrode of said given device while said write voltage is being applied thereto, whereby said given device is caused to have a first threshold voltage value in the event said given intensity is said first intensity, and a second threshold voltage value in the event said given intensity is said second intensity;

applying a read voltage to said control electrode of said given device after said given time interval, said read voltage having a value between said first and second threshold voltage values;

directing an electron beam towards one of the main electrodes of said given device while said read voltage is being applied thereto; and detecting the current flowing between said two main electrodes of said given device while said electron beam is applied to said one main electrode.

6. The method according to claim 5 in which said digital information may be erased from said given memory element by further including the steps of:

applying an erase voltage to the control electrode of said given device, said erase voltage having an opposite polarity from the write voltage previously applied thereto; and directing an electron beam towards said control electrode of said given device while said erase voltage is being applied thereto.

7. A method by which digital information may be serially written into, stored by, and thereafter serially read from a given number of memory elements of a beam accessed insulated-gate field-effect semiconductor device memory which includes a plurality of insulated-gate field-effect semiconductor device memory elements, each of said devices having two main electrodes and a control electrode, said method comprising the steps of:

causing an electron beam to be scanned across the control electrodes of each of said devices, one at a time, the intensity of said beam as it scans across any given device being determined by the bit which is to be written into said given device;

applying a write voltage to the control electrode of the device then having its control electrode scanned by said electron beam;

causing said electron beam to thereafter be scanned across one main electrode of each of said devices, one at a time;

applying a read voltage to the control electrodes of the device then having its one main electrode scanned by said electron beam; and detecting whether a substantial current is flowing between said two main electrodes of each of said devices at the time said electron beam is scanning the one main electrode of that device.

8. The method according to claim 7 in which said digital information may be erased from said given number of memory elements by further including the steps of:

applying an erase voltage to the control electrode of each of said several devices, said erase voltage having a polarity opposite from the polarity of said read voltage; and causing said electron beam to be scanned across the control electrodes of each of said several devices.

9. A beam accessed semiconductor memory comprising:

a plurality of semiconductor devices each of which has a first and a second main electrode and a control electrode, there being an electrical path between the first and second main electrodes of each of said devices, said path in any one of said devices having a first resistance in the event a voltage is applied to the control electrode of that one device which has a polarity the same as and a magnitude greater than a certain threshold voltage associated with that one device, and a second resistance, which is greater than said first resistance, in the event a voltage is applied to the control electrode of that one device which has a polarity opposite from or of a polarity the same as and a magnitude less than said certain threshold voltage, first selected ones of said devices having a first threshold voltage associated therewith and second selected ones of said devices having a second threshold voltage associated therewith, said second threshold voltage being of the same polarity as and having a greater magnitude than the first threshold voltage;

means for connecting each of said control electrodes to a source of voltage which provides a voltage having a value between said first threshold voltage and said second threshold voltage; and means for causing an energy beam to be directed towards the first main electrode of each of said devices, one at a time.

10. The invention according to claim 9 wherein said memory further includes means for sensing the current flowing between said first and second main electrodes of each respective device whenever said energy beam is directed toward the first main electrode of that device.

11. The invention according to claim 9:

wherein said semiconductor devices are metal-oxide semiconductor transistors, said first and second main electrodes being a drain and a source and said control electrode being a gate; and wherein said energy beam is an electron beam.

12. The invention according to claim 9 wherein each of said plurality of devices is so arranged that at least a portion of said first main electrodes are positioned along a given path, and wherein said energy beam causing means includes means for causing said energy beam to traverse said given path.

13. The invention according to claim 9 wherein said energy beam is an electron beam which acts as a current source whenever it is directed towards the first main electrode of a given device, and wherein the amount of current provided by said current source is dependent upon the resistance of said electrical path in said given device.

14. The invention according to claim 13 in which binary bits of first and second values are stored in said memory in such a manner that those devices having said first threshold voltage associated therewith represent stored bits of said first value and those devices having said second threshold voltage associated therewith represent stored bits of said second value wherein said binary bits are read from said memory by having said memory further include means for sensing the current flowing between said first and second main electrodes of each device whenever said electron beam is being applied to the first main electrode of that device, said sensed current representing said binary bits by having substantial current then flowing between said main electrodes represent bits of said first value and negligible current then flowing between said first and second main electrodes represent bits of said second value.

15. A beam accessed insulated-gate field-effect transistor memory comprising:

a plurality of insulated-gate field-effect transistor devices each of which has a first main electrode, a second main electrode, and a control electrode;

voltage means for applying one of a first voltage or a second voltage to the control electrode of at least a portion of said devices, said first voltage being applied on command of a write signal and said second voltage being applied on command of a read signal;

electron beam providing means for causing, on command of said write signal, an electron beam to be directed towards the control electrode of selected ones of said devices included in said portion of devices and for causing, on command of said read signal, an electron beam to be directed towards the first main electrode of each one of said devices included in said portion of devices; and control circuitry for providing said write and read signals.

16. The invention according to claim 15:

wherein each one of said devices has a threshold voltage associated therewith, said threshold voltage being variable as a function of the simultaneous direction of an electron beam of a certain intensity towards and the application of a voltage of a certain value to the control electrode of said one device; and wherein the simultaneous direction of an electron beam of a first given intensity towards and application of said first voltage to the control electrode of any one device causes the threshold voltage thereof to become a first value and the simultaneous direction of an electron beam of a second given intensity towards and application of said first voltage to the control electrode of said one device causes the threshold voltage thereof to become a second value, the values of said first given intensity, said second given intensity, said first voltage, and said second voltage being so chosen that the value of said second voltage is between the value of said first threshold voltage and the value of said second threshold voltage.

17. The invention according to claim 16:

wherein said control circuitry further includes control means for causing the simultaneous direction of an electron beam of a given intensity towards the first main electrode and the application of said second voltage to the control electrode of any one of said devices to cause a current to flow between the first and second main electrodes thereof, said current being substantial in the event said one device has said first threshold voltage associated therewith, and said current being negligible in the event said one device has said second threshold voltage associated therewith; and wherein said memory further includes means for detecting whether a substantial or a negligible current is flowing between the first and second main electrodes of each of said devices at a time when said control means causes an electron beam of said given intensity to be directed towards the first main electrode of a device and said second voltage to be applied to the control electrode of that device.

18. The invention according to claim 15:

wherein said plurality of insulated-gate field-effect transistor devices are arranged in a matrix, a given number of said devices being in a block of said matrix;

wherein said given number of devices are aligned with respect to one another in said block so that said first main electrodes are along a first path and said control electrodes are along a second path;

wherein a certain number, equal to or less than said given number, of binary bits, which may be of a first bit value or a second bit value, can be written into, stored by, or read from said given number of devices, there being one bit for each device;

wherein said given number of bits are written into said memory by said control circuitry providing said write signal, said electron beam providing means, in response to said write signal, causing said electron beam to be scanned across said second path in such a manner that said beam has a first intensity when it is directed towards a device which is to have a bit of said first bit value written therein and a second intensity when it is directed towards a device which is to have a bit of said second bit value written therein;

wherein the value of the threshold voltage associated with those devices having said beam of said first intensity directed thereto becomes a first threshold voltage value and the value of the threshold voltage associated with those devices having said beam of said second intensity directed thereto becomes an initial threshold voltage value, said first threshold voltage value being such that the value of said second voltage is between said first threshold voltage value and said initial threshold voltage value, those devices having said first threshold value associated therewith representing the storage therein of a bit of said first bit value and those devices having said initial threshold voltage value associated therewith representing the storage therein of a bit of said second bit value; and wherein said certain number of bits are read from said memory by said control circuitry providing said read signal, said electron beam providing means, in response to said read signal, causing said electron beam to be scanned across said first path in such a manner that each time said beam is directed towards a device, the intensity of said beam is the same value, whereby substantial current flows between the first and second main electrodes of each device having said first threshold voltage value associated therewith when said beam is directed thereto and negligible current flows between the first and second main electrodes of each device having said initial threshold voltage value associated therewith when said beam is directed thereto, said bits of said first bit value being read by detecting said substantial current and said bits of said second value being read by detecting said negligible current.

19. The invention according to claim 18 wherein said bits which have been written into said memory may be erased therefrom by said electron beam providing means causing said electron beam to scan said second path in such a manner that each time said beam is directed towards a device, the intensity of said beam is the same value, and by said control circuitry simultaneously providing a third voltage to the control electrode of each device, said third voltage being of opposite polarity from said first voltage.

20. The invention according to claim 19 wherein said memory further includes means for detecting whether a substantial or a negligible current flows between the first and second main electrodes of each device at the time said electron beam is applied to the first main electrode thereof.

21. The invention according to claim 20 wherein said devices are metal oxide semiconductor devices in which said first main electrode is a drain thereof, said second main electrode is a source thereof, and said control electrode is a gate thereof.

22. A beam accessed metal oxide semiconductor memory comprising:

an evacuated chamber;

means for providing a modulating, a read, and a write signal;

means for providing an electron beam in said chamber, said electron beam being capable of being modulated in response to said modulating signal;

means for affecting the direction of said electron beam so that upon the occurrence of said write signal, said beam scans across a first path and upon the occurrence of said read signal, said beam scans across a second path;

target means positioned within said chamber, including an integrated circuit having a plurality of metal oxide semiconductor transistors built thereon, each of said transistors having a drain, a source, and a gate region on said integrated circuit, said transistors being so positioned on said integrated circuit that in a given block of said transistors, all of the gate regions are aligned along said first path and all of the drain regions are aligned along said second path, each of said transistors having a threshold voltage capable of being varied associated therewith;

means, which on the occurrence of said write signal applies a write voltage to each gate region in said block and modulates said electron beam in accordance with said modulating signal, for causing selected transistors in said block to have a threshold voltage which is greater in magnitude than a certain read voltage and for causing the remaining transistors in said block to have a threshold voltage which is smaller in magnitude than said read voltage;

means which, on the occurrence of said read signal, applies said read voltage to each gate region; and means for detecting any substantial current flowing between the source and drain regions of any transistor at the time said electron beam is being scanned across the drain region thereof.

23. The invention according to claim 22 in which each one of an integrally ordered predetermined number of bits are to be written into and thereafter read out of the transistors in said block in such a manner that one bit corresponds to one transistor, each of said bits being of either a first type or a second type;

wherein said modulating signal providing means includes means responsive to the order and type of said predetermined number of bits for causing said electron beam to have a first intensity when it is scanned across the gate region of a transistor which corresponds to a bit of said first type and to have a second intensity when it is scanned across the gate region of a transistor which corresponds to a bit of said second type;

wherein the threshold voltage of each transistor in said block assumes a value dependent upon the intensity of the electron beam that is scanned across the gate region thereof; and wherein said detecting means includes means for detecting the presence of a substantial current flowing between the source and drain regions of a transistor in said block to indicate a bit of said first type being read therefrom and the absence of a substantial current flowing between the source and drain regions of a transistor in said block to indicate a bit of said second type.

24. The invention according to claim 23:

wherein said memory further includes erase voltage providing means; and wherein said bits which have been written into said memory may be erased therefrom by said means for affecting the direction of said electron beam further causing said electron beam to scan across said first path during the same time said erase voltage providing means applies an erase voltage to each gate region of said transistors in said block, said erase voltage having a polarity opposite to the polarity of said write voltage.

References Cited

UNITED STATES PATENTS

| | | | |
|---|---|---|---|
| 3,528,064 | 9/1970 | Everhart | 328—123 X |
| 3,483,414 | 12/1969 | Kazan | 313—65 AB |
| 3,577,047 | 5/1971 | Cheroff | 307—304 X |

| | | | |
|---|---|---|---|
| 3,579,204 | 5/1971 | Lincoln | 307—238 X |
| 3,626,387 | 12/1971 | Terman | 340—173 R |

OTHER REFERENCES

Speth; Electron Beam Control of FET Characteristics, September 1965, IBM Technical Disclosure Bulletin, vol. 8, No. 4, pp. 638–639.

BERNARD KONICK, Primary Examiner

S. HECKER, Assistant Examiner

U.S. Cl. X.R.

307—279; 313—65 AB; 328—124; 340—173 R